United States Patent Office 3,528,812
Patented Sept. 15, 1970

3,528,812
SENSITIZATION OF LIGHT-SENSITIVE POLYMERS
Justus Danhäuser and Hans Öhlschläger, Cologne-Stammheim, Willibald Pelz, Opladen, and Oskar Riester, Leverkusen, Germany, assignors to Agfa-Gevaert Aktiengesellschaft, Leverkusen, Germany, a corporation of Germany
No Drawing. Filed Jan. 31, 1967, Ser. No. 612,831
Claims priority, application Germany, Feb. 18, 1966, A 51,615
Int. Cl. G03c 1/68
U.S. Cl. 96—115         7 Claims

ABSTRACT OF THE DISCLOSURE

Sensitizers for photo-resist resins have the structure

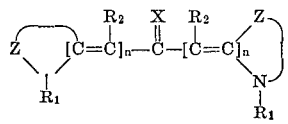

wherein Z represents the ring members required for completing a 5- or 6-membered heterocyclic ring, which ring may have fused thereto a benzene or naphthalene ring. Preferred heterocyclic ring systems are, for example, indole, benzoindole, dihydroindole, thiazole, benzthiazole, naphthothiazole, selenazole, benzoselenazole or naphthoselenazole; $R_1$ is an alkyl group having preferably up to 5 carbon atoms; $R_2$ represents a hydrogen atom or an alkyl with preferably up to 3 carbon atoms, such as methyl or ethyl; X is an oxygen or sulfur atom and $n=1$ or 2, preferably 1.

The present invention relates to the sensitization of light-sensitive polymers for use in photographic reproduction.

It is well known in the art of photomechanical reproduction to utilize light-sensitive polymers for forming resist images. These polymers are applied as a thin layer to a suitable support, which after exposure may be selectively dissolved in the unexposed areas by development with a solvent while the exposed and changed image parts of the layer remain insoluble in the solvent. Such light-sensitive synthetic resins contain light-sensitive groups such as cinnamic acid, azido or sulfazide groups.

It is also known that the light-sensitivity of these synthetic resins can be greatly enhanced by using such sensitizers as triphenylmethane dyes, aromatic ketones, or nitro compounds.

The object of the invention is to provide new sensitizers and to increase as much as possible the light-sensitivity of synthetic resins which undergo cross-linking on exposure to light.

We now have found that the light-sensitivity of synthetic resins which undergo cross-linking upon exposure, can be greatly increased by using, as sensitizers, symmetrical or asymmetrical compounds of the following structure:

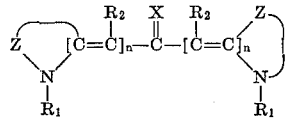

wherein:

Z represents the ring members required for completing a 5- or 6-membered heterocyclic ring, which ring may have fused thereto a benzene or naphthalene ring. Preferred heterocyclic ring systems are, for example, indole, benzoindole, dihydroindole, thiazole, benzthiazole, naphthothiazole, selenazole, benzoselenazole or naphthoselenazole;

$R_1$ is an alkyl group having preferably up to 5 carbon atoms;
$R_2$ represents a hydrogen atom or an alkyl with preferably up to 3 carbon atoms, such as methyl or ethyl;
X is an oxygen or sulfur atom and
$n=1$ or 2, preferably 1.

The heterocyclic rings or aryl groups in the above formula may be further substituted in any way desired, e.g., with an alkyl group having preferably up to 5 carbon atoms, such as methyl or ethyl, or with halogen atoms, such as chlorine or bromine, or with alkoxy groups containing preferably up to 5 carbon atoms, such as methoxy.

The nature of these substituents is of secondary importance when considering the sensitizing effect obtained, however, by suitable choice of these substituents it is possible to influence other physical properaties such as solubility, as desired. Suitable compounds are, for example, those of the following formulae:

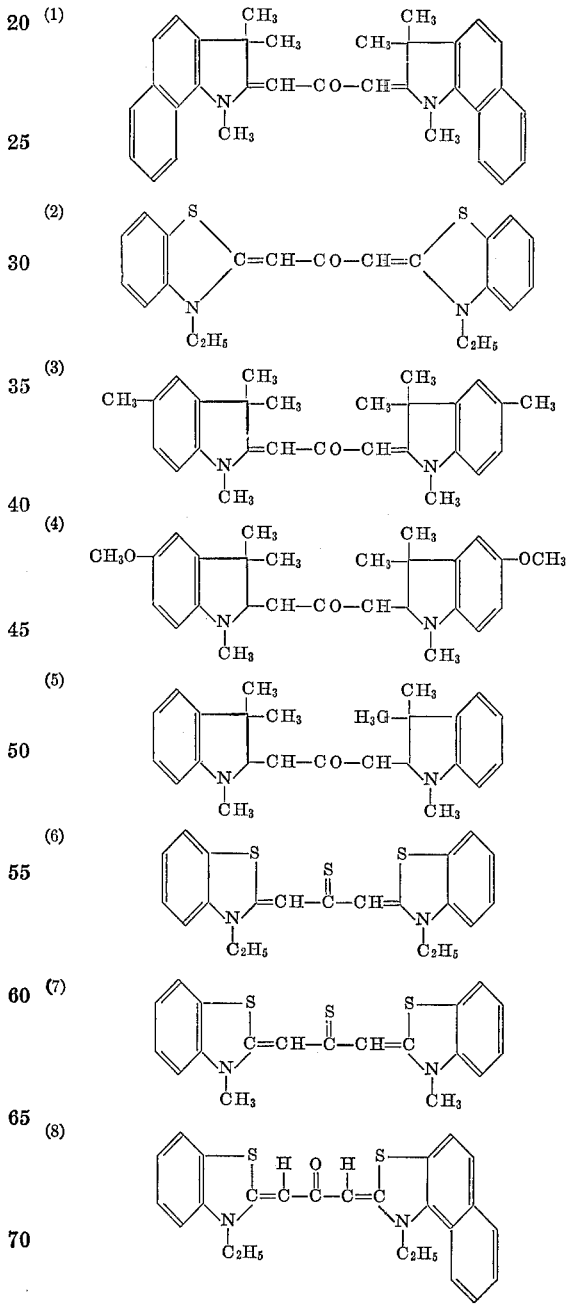

The sensitizers to be used according to the invention can be prepared by the usual method, e.g., by reaction of the corresponding quaternary heterocyclic starting compounds with phosgene or thiophosgene. Sensitizers 2, 6 and 7 for example, can thus be obtained by the reaction of the corresponding quaternary 2-methylbenzothiazole with phosgene or thiophosgene.

The preparation of sensitizers 5 and 8 is described in described in detail below.

SENSITIZER 5

Di(N - methyl - 3,3 - dimethylinodoleninemethylene)-ketone. 14.8 g. of phosgene are introduced into 200 ml. dry benzene, and 52 g. of 1,3,3 - trimethyl - 2 - methylene-2,3-dihydro-indole dissolved in 50 ml. benzene and 25 ml. pyridine are added in the course of 2 hours at room temperature. The reaction mixture is heated to 60–70° C. for 30 minutes and introduced into 500 ml. water. The precipitate is separated by filtration under suction and washed with methanol. M.P. 232° C.

Sensitizers 1, 3 and 4 are prepared in an analogous manner using the corresponding derivatives of the above starting component.

SENSITIZER 8

2 - (2 - methoxy - propylidene)-3-ethyl-benzothiazole-tosylate is condensed with 2 - methyl - mercapto-3-ethyl-α - naphtho - thiazole - methyl sulphate in alcohol with triethylamine, and the resulting meso - methoxy - trimethine-cyanine is heated for one hour under reflux in pyridine to give the final keto-compound of M.P. 268° C.

The sensitizers used according to the invention increase the light-sensitivity of polymers which undergo cross-linking in the light. They are preferably used in combination with light-sensitive polymers in which the groups capable of cross-linking under the influence of light are cinnamic acid or azido groups. Polymers of this type, and light-sensitive layers produced therefrom have been described, for example, in British patent specifications Nos. 695,197 and 822,861.

Polymers containing azido groups are described in British patent specifications Nos. 843,542, 843,541 and 815,471. Polymers containing sulfazide groups are described in German patent specification No. 1,224,494 and Belgian Pats. Nos. 665,427 and 645,428.

Other suitable light-sensitive polymers are described in German patent applications Nos. A48874 IXa/57b and A51476 IXa/57b.

The sensitizers according to the invention are employed in the usual manner. As a rule, the light-sensitive synthetic polymers are dissolved in suitable solvents, and the sensitizer is added to the casting solution.

The concentration of sensitizer in the light-sensitive layer is not critical and depends somewhat upon the solubility of the sensitizing agent in the particular solvent used in the light-sensitive polymer of the final layer. A required concentration depends furthermore on the original sensitivity of the light-sensitive polymer and to some extent on the thickness of the final layer, whereby it will vary according to a slightly lower concentration usually being employed in the case of thicker layers in order to ensure thorough hardening of the layer.

The optimum concentration can be determined in known manner by a few simple tests customarily employed in the art. Generally a concentration of about 1 to 10%, preferably 1 to 8% by weight is sufficient.

The sensitized layers of the present invention are processed in accordance with common practice. The sources of light employed are preferably high-energy carbon arc lamps or mercury vapour lamps. After exposure, the layer is developed in known manner by dissolving out the unexposed parts of the layer. Suitable solvents and solvent concentrations for the coating compositions and for developing the exposed sensitive layers of the invention can be selected from those set forth in the patent specification mentioned hereinbefore. The relief images obtained can then be used in the usual ways.

EXAMPLE 1

4 g. of a reaction product of 1 part of ethylene-vinyl alcohol copolymer and 2 parts of m-isocyanato-cinnamic acid ethyl ester (see British patent specification No. 822,861) and 0.04 g. sensitizer No. 1 are dissolved in 46 g. butyl acetate. An aluminum foil is coated with the solution in a centrifuge (100 revolutions per minute) and dried for 5 minutes.

The layer is exposed for 5 minutes behind a grey step wedge with a carbon arc lamp (30 a., 42 v.) at a distance of 70 cm. and developed for 2 minutes in butyl acetate which contains 0.1% Irisolechtblau BLE (CIS591). The layer is washd with water and dried in air. 9 steps of the grey wedge are visible on the support.

If the layer is exposed under the same conditions without the addition of sensitizer, then only 4 steps of the grey wedge are visible. Density of step 4: 0.46, step 9: 1.23. It follows from this that there is a sixfold increase in sensitivity on the addition of sensitizer.

The effect of other sensitizers of the present invention which are applied as described above instead of sensitizer 1 are shown in the following table:

| Sensitizer: | Sensitivity |
|---|---|
| 2 | 11.5 |
| 3 | 11.5 |
| 4 | 5.5 |
| 5 | 17 |
| 6 | 3 |
| 7 | 4 |
| 8 | 5.5 |

The sensitivity of the sensitized layer compared with that of the non-sensitized layer is calculated from the number of coloured steps of the layer remaining on the support, according to the equation:

$$Sx = \frac{\text{antilog } Dx}{\text{antilog } Do}$$

where $Dx$ is the density of the last step of sensitized layer still adhering to the support, and $Do$ is the density of the last step of the non-sensitized layer still found on the support.

EXAMPLE 2

The procedure carried out is the same as that described in Example 1, except that instead of light-sensitive polymer used in Example 1, a polymer which has been obtained by reacting 10 g. of a copolymer of vinyl chloride and vinyl alcohol with 7.3 g. of p-azidobenzoyl chloride in pyridine (see also British patent specification No. 843,541) is applied.

The increase of sensitivity is shown in the following table:

| Sensitizer: | Sensitivity |
|---|---|
| 3 | 3 |
| 4 | 1.5 |
| 5 | 6.5 |
| 7 | 2.7 |

EXAMPLE 3

The procedure carried out is the same as that described in Example 1. The light-sensitive polymer used, however, is that indicated in Example 7 of German patent specification No. 1,224,494.

The effects of sensitizers used according to the invention are shown in the following table:

| Sensitizer: | Sensitivity |
|---|---|
| 1 | 2.5 |
| 2 | 4.5 |
| 3 | 14 |
| 4 | 10 |
| 5 | 17 |
| 7 | 6.5 |

The increase in sensitivity is determined as described in Example 1.

What is claimed is:

1. A composition comprising a light-sensitive, film-forming polymer selected from the group of polymers capable of being cross-linked upon exposure to light consisting of polymers containing cinnamic acid groups or azide groups and a sensitizing amount of a sensitizer of the following formula:

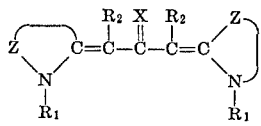

wherein:

Z represents the ring members required to complete a ring selected from the class indole, benzoindole, dihydroindole, thiazole, benzothiazole, naphthothiazole, selenazole, benzoselenazole and naphthoselenazole rings;

$R_1$ represents an alkyl group;

$R_2$ is a hydrogen or an alkyl group containing up to 3 C-atoms; and

X is an oxygen or sulphur atom.

2. A composition as defined in claim 1, characterized in that Z represents the ring member required for completing a benzo-2,3-dihydroindole ring.

3. A composition as defined in claim 1, characterized in that $R_1$ represents methyl and Z stands for the ring members required for completing a 3,3-dimethyl-6,7-benzo-2,3-dihydroindole ring.

4. A composition as defined in claim 1, in which the sensitizer has the formula:

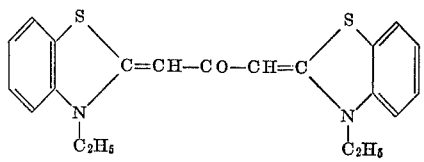

5. A composition as defined in claim 1, in which the sensitizer has the formula:

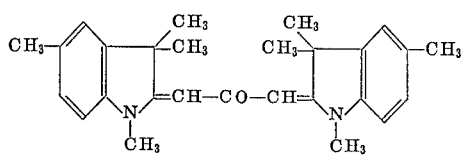

6. A composition as defined in claim 1, in which the sensitizer has the formula:

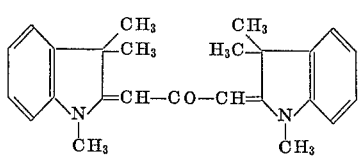

7. A composition as defined in claim 1, in which the light-sensitivity of the polymer is contributed by cinnamic acid or phenyl azido groups.

References Cited

UNITED STATES PATENTS 2,732,301  1/1956  Robertson et al. _____ 96—115

RONALD H. SMITH, Primary Examiner

U.S. Cl. X.R.

96—35.1